Oct. 4, 1955 J. H. McGUIGAN ET AL 2,719,964

MAGNETIC SURFACE WRITING CIRCUIT UTILIZING MAGNETIC CORES

Filed Nov. 20, 1953 2 Sheets-Sheet 1

INVENTORS: J. H. Mc GUIGAN
H. E. VAUGHAN

BY [signature]

ATTORNEY

MAGNETIC SURFACE WRITING CIRCUIT UTILIZING MAGNETIC CORES

Filed Nov. 20, 1953

INVENTORS: J. H. Mc GUIGAN
H. E. VAUGHAN
BY
ATTORNEY

United States Patent Office 2,719,964

Patented Oct. 4, 1955

2,719,964

MAGNETIC SURFACE WRITING CIRCUIT UTILIZING MAGNETIC CORES

John H. McGuigan, New Providence, and Henry E. Vaughan, Chatham, N. J., assignors to Bell Telephone Laboratories, Incorporated, New York, N. Y., a corporation of New York Application November 20, 1953, Serial No. 393,388

11 Claims. (Cl. 340—174)

This invention relates to circuits for writing on a magnetic or magnetizable surface and more particularly to such circuits utilizing magnetic cores.

Magnetic drums or other devices employing moving magnetizable surfaces are finding increasing application in recording, storage, computing, telephone, and other electrical systems in which two valued information capable of representation as one of two states is to be stored and subsequently utilized. When such a system utilizes a magnetic drum, a plurality of magnetic heads are placed in proximity to the magnetic surface and the area of the surfaces which passes under any head is divided into a number of discrete cells in each of which information may be written by magnetizing the surface in either of two directions. Each magnetic head generally comprises a coil or coils surrounding a magnetic structure and may be used either to write information in one of these cells or to read information priorly written in the cell.

As pointed out and fully described in Patent No. 2,700,148, issued January 18, 1955, to J. H. McGuigan, O. J. Murphy, and N. D. Newby, the reading and writing may occur in a single pass of the cell under the magnetic head. This can be accomplished as the reading occurs when the magnetic head is adjacent the point where there is a maximum rate of change in flux along the surface, whereas the writing occurs at the center of the cell where there is maximum magnetic flux, and therefore the rate of change of flux is zero.

In order to write either of two values, current pulses must be driven through the winding of the magnetic head in either direction. In one system employing magnetic drums in a common control telephone system, as disclosed in an application Serial No. 340,471, filed March 5, 1953, of W. A. Malthaner and H. E. Vaughan, the current pulses through the head on writing information on the magnetic drum are of the order of three microseconds in duration. The heads employed required a current pulse amplitude of the order of 250 milliamperes. Since the head is used for both reading and writing on a single pass of the cell beneath it, as discussed above, it is desirable that between writing pulses the impedance of the writing circuit as viewed from the magnetic head be reasonably high compared to the head impedance itself, in order to avoid unduly high loss of the voltage induced in the head during the reading process.

Prior circuits for writing on the magnetic surface are disclosed in the above-mentioned McGuigan-Murphy-Newby patent and in an application Serial No. 307,108, filed August 29, 1952, of W. A. Cornell, J. H. McGuigan, and O. J. Murphy. These circuits utilize a number of double triode tubes, pulsing transformers, and other elements to attain the necessary momentary storage of the information within the circuit until the proper cell on the magnetic surface is under the magnetic head, the required writing power, and the necessary synchronization of the writing of the information on the magnetic surface. Additionally, these circuits have imposed a limit on the rapidity of operation of the accompanying system. When an attempt is made to increase the speed of reading and writing on the moving magnetic surface or drum, the delay of the writing amplifier circuit, between the time the writing pulse is applied to the circuit and the time the magnetic flux is actually changed, becomes important; thus, in the Cornell et al. application referred to above, this delay is of the order of 0.5 microsecond.

It is an object of this invention to provide an improved circuit for the writing of two valued information on a moving magnetic surface or drum.

It is a further object of this invention to enable magnetic surface systems to operate at higher speeds and faster access rates. The speed of operation of the system and the speed of motion of the magnetic surface or rotation of the magnetic drum are dependent upon the time requisite for the writing and reading operations. It is an object of this invention to reduce the time required for writing information on a moving magnetic surface and thereby to increase the speed or frequency of operation of the system employing the magnetic surface. More specifically, it is an object of this invention to decrease the writing delay inherent in the response of the writing circuit between the application of a writing pulse to the circuit and the changing of the magnetic flux condition on the magnetic surface.

It is another object of this invention to reduce the number of circuit components required in a magnetic surface writing circuit.

It is a still further object of this invention to provide a magnetic surface writing circuit wherein the same circuit components may be employed for the temporary storage of information and for the application of the writing pulse and synchronization of the writing pulse. In prior writing circuits, distinct toggle, multivibrator, or other storage circuits have been employed to attain storage of the information until the cell on the magnetic surface in which it is desired to write the information comes under the magnetic writing head. It is an object of this invention to attain storage of information while awaiting access to the head without employing these additional circuit elements.

It is a still further object of this invention to provide a simplified writing circuit and to improve single pass operation of reading and writing information on a moving magnetic surface.

In specific illustrative embodiments of this invention, a pair of magnetic cores is employed, one core being set by being put into a particular state of magnetization when it is desired to write one value of the information and the other core being set when it is desired to write the other value of information on the magnetizable surface. The output windings of these cores are connected to opposite terminals or corners of a bridge network having the coils of a magnetic head in one arm of the bridge or in two opposite arms of the bridge. After a core has been set, and thus a command to write one or the other value of information stored in the core, the stored information is read out by the application of an advance pulse to advance windings on each of the cores. Upon application of the advance pulse, current will flow through the arms of the bridge network and, in accordance with an aspect of this invention, the direction of current flow through the magnetic head when it is desired to write one value of information is the opposite of the direction of current flow through the magnetic head when it is desired to write the other value of information. The information written on the moving magnetizable surface by the magnetic head will therefore be dependent on which of the two cores had priorly had stored in it a command to write one value of information or the other.

As information stored in these cores may be read out at very high speeds the delay between the application of an advance pulse, which is the order from the associated circuitry to the write circuit to write on the moving magnetic surface the value stored in one of the cores, and the application of the writing current pulse to the magnetic head itself, and thus the actual changing of the magnetization of the cell on the magnetic surface, may be very short. In one specific illustrative embodiment of this invention, this delay has been of the order of 0.05 microsecond, or about one-tenth as long as the delay required by the writing circuits of the above-mentioned applications.

In circuits in accordance with this invention, the magnetic core serves to store temporarily the information to be written on the magnetic surface until access is had to the appropriate cell or spot on the surface for writing, to enable a choosing of either of the two values to be written, and to attain synchronization of the writing of the information on the magnetic surface with the other elements of the system. By employing magnetic cores in a magnetic surface writing circuit in accordance with this invention there is realized not only a considerable savings in the number of circuit components required, but also considerable savings as well in the size of the writing circuit, the power dissipation of the circuit, and the likelihood of component failure.

It is therefore a general feature of this invention that a magnetic surface writing circuit comprise a pair of magnetic cores in which either of two values of information may be temporarily stored and a magnetic head through the coil or coils of which current flows in either of two directions depending on the value stored in the magnetic cores on application of a write command pulse to the magnetic cores.

It is a further general feature of this invention that the coil or coils of the magnetic head be included in at least one arm of a bridge network having compensating networks in the other arms of the network and that the output windings of the magnetic cores be connected to different opposite corners of the bridge so that the current through coils of the magnetic head is in one direction if one value is to be written on the magnetic surface and in the other direction if another value is to be written on the magnetic surface. More specifically it is a feature of one particular embodiment of this invention that the magnetic head comprise a pair of coils electrically positioned in opposite arms of the bridge.

A complete understanding of this invention and of the various features thereof may be gained from consideration of the following detailed description and the accompanying drawing, in which.

Figure 1:
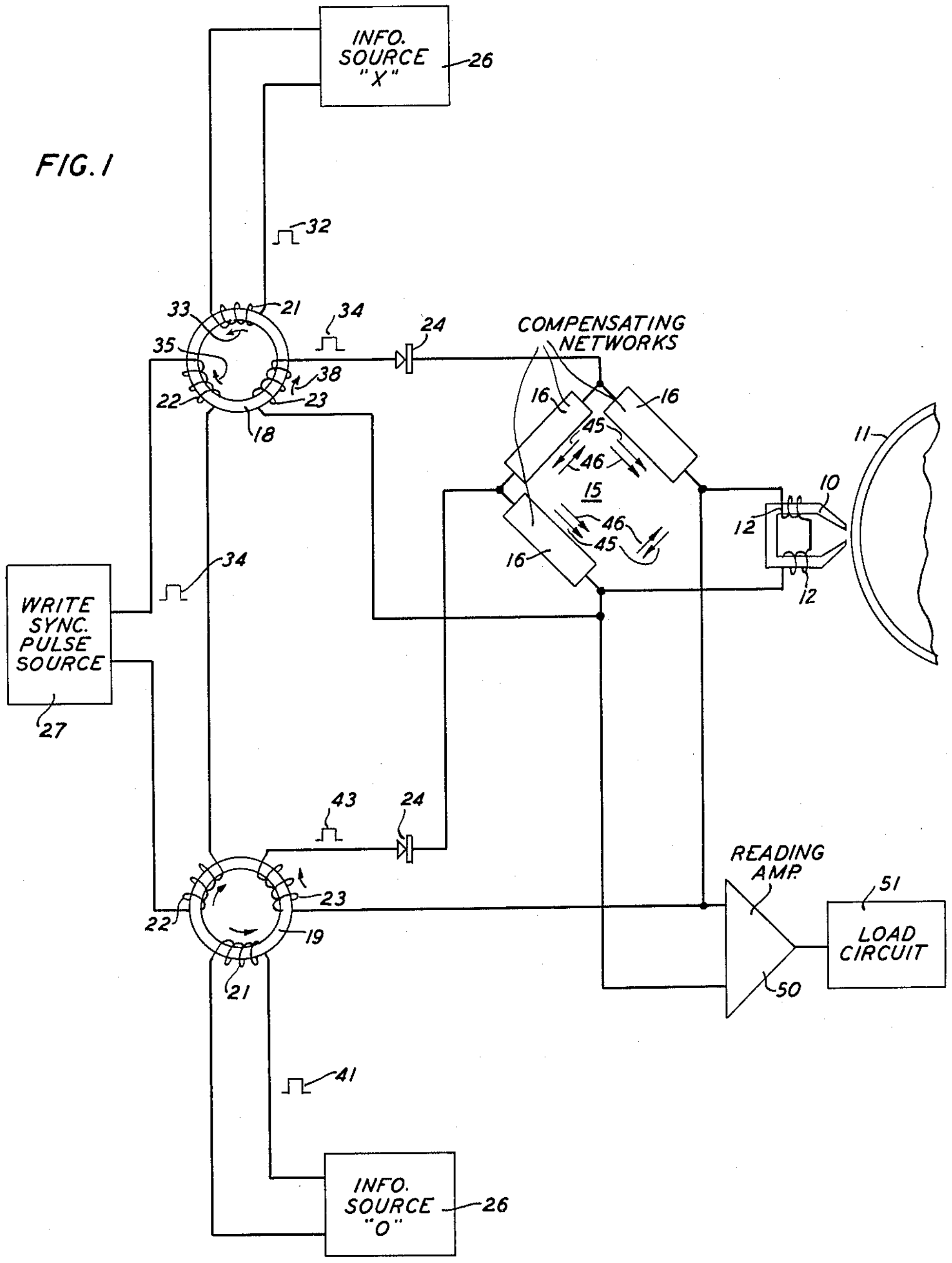
Fig. 1 is a schematic representation of one specific illustrative embodiment of this invention.

Turning now to the drawing, Fig. 1 is a schematic representation of one illustrative embodiment of this invention wherein the magnetic reading and writing head 10 in close juxtaposition to a moving magnetic surface 11 comprises a pair of windings 12 wound in series aiding on opposite legs of the head 10. The moving magnetic surface 11 may comprise the surface of a magnetic drum, as is known in the art. The windings 12 are connected in one arm of a bridge network 15, the other three arms of which comprise compensating or balancing networks 16 which just match the impedance of the head. These networks 16 may comprise combinations of conventional circuit elements or may readily be merely dummy heads identical with head 10 but not associated with any movable magnetic surface. Dummy heads have the advantage over simulating networks that they are sure to provide a good match under all conditions, as they are in fact identical with the magnetic head 10. However, either type of compensating network may be employed for the other arms of the bridge 15.

Two magnetic cores 18 and 19 are utilized, in accordance with an aspect of this invention, to attain the desired storage, synchronization, and generation of pulses required in a writing circuit. Each core has three windings, the windings being a set winding 21, an advance winding 22, and an output winding 23. The output windings 23 are connected through diodes 24 across the two opposite terminals or corners of the bridge network 15. Each of the set windings 21 is connected to a separate information source 26 and each of the advance windings to a single pulse source 27 which we can identify as a write synchronizing pulse source.

Figure 2:
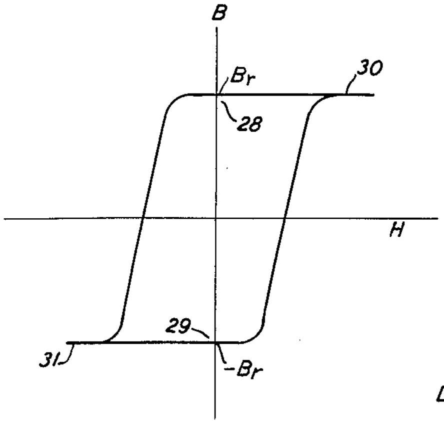
Fig. 2 is a plot of a typical hysteresis loop of a magnetic core of the type employable in embodiments of this invention.

Turning now to Fig. 2, there is depicted a typical B-H or hysteresis loop of a magnetic core, such as cores 18 and 19. The materials employed for these cores are generally characterized by a high remanence so that when the magnetizing force is removed after the material has been magnetized to saturation, the residual flux density, at points 28 or 29, is nearly equal to the saturation flux density, at points 30 or 31, respectively; this characteristic has caused these materials to be referred to as having square hysteresis loops. Such materials include certain ferrites such as the General Ceramics MF1118 Ferramic material, Deltamax, a grain-oriented 50 per cent nickel-iron alloy of the Allegheny Ludlum Steel Corporation, 4–79 molybdenum permalloy, supermalloy, or other materials known in the art.

Figure 4:
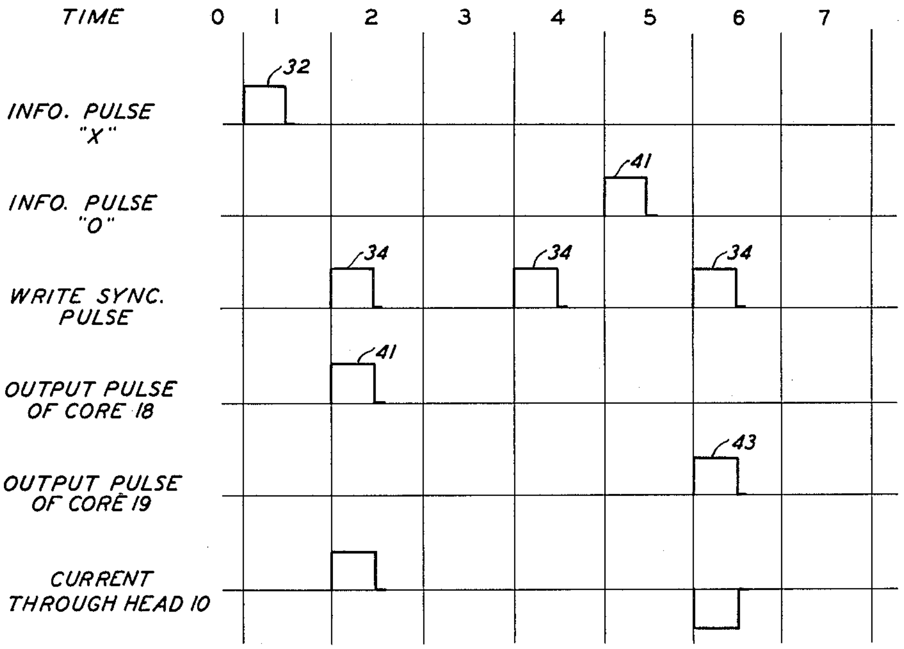
Fig. 4 is an idealized time plot of various current pulses occurring during one particular sequence of operation of the embodiment of Fig. 1.

The operation of this specific illustrative embodiment of the invention can now be considered with reference to Figs. 1, 2 and 4. Each information source 26, shown diagrammatically in Fig. 1, may actually be the associated circuitry controlling the writing of the information in the cell on the magnetic surface 11 and we shall assume that the information to be written comprises either a mark "X" or no mark, which we shall call "0." Thus core 18 is the writing core employed for writing "X" and core 19 the core employed for writing "0." As seen in Fig. 4 we shall assume that in the first time interval information source 26 associated with core 18 is operated to apply an information pulse write "X," identified as pulse 32, to the set winding 21 of core 18. Pulse 32 magnetizes the core in a counter-clockwise direction indicated by the arrow 33 and, in terms of the hysteresis loop of Fig. 2, changes the state of the core from point 28 to point 29. The information is now stored in the core 18 that, upon the finding of the proper access, an "X" is to be written in the cell of that access.

In Fig. 4 we have assumed that the cell in which the information is to be written appears, at time 2, under the magnetic head 10. However, it is an aspect of this invention that the core writing circuit itself provides the necessary storage of the information for any desired period of time and it is thus to be understood that the information need not be written in the designated cell on the magnetic surface 11 in the next or any particular time interval. However, when the associated system desires that the information be written in the designated cell on the magnetic surface 11, an advance or write sync pulse 34 is applied from a pulse source 27 to the advance windings 22 of each of the cores 18 and 19. Pulse source 27 includes the associated circuitry which determines that the head 10 has access to the appropriate cell, assures that the writing of information on all cells occurs in synchronism, and operates only when advised that the system sequence or programming desires the information to be written. Examples of the type of circuitry that may be included in the pulse source 27 and the conditions of its operation may be found in the telephone system disclosed in the above-mentioned Malthaner-Vaughan application.

When the pulse 34 is applied to the advance winding 22 of core 18, a clockwise positive magnetizing force is applied to the core, as indicated by the arrow 35, which causes the state of the core to shift from point 29, on the hysteresis loop of Fig. 2, through point 30 to point 28. The flux change corresponding to this change of state induces a voltage across the output winding 23 of core 18, the flow of current induced in the output winding 23 in this case being indicated by the arrow 38 and comprising a write pulse 39. This write pulse 39 is applied, through the diode 24, to the bridge network 15.

When the flux changes in the core 18 due to application of the set pulse 32, the voltage induced in the output winding 23 is of such polarity that the diode 24 prevents the flow of current to the bridge network 15. No current flows in the advance winding on application of the set pulse 32 as the pulse source 27 is advantageously a high impedance source. Under these conditions the set pulse or information source 26 needs only to deliver the energy required to switch the core, i. e., the energy represented by one-half the area of the hysteresis loop. When the advance pulse 34 is applied, current flows in both the advance and output windings. The pulse source 27 has to supply the energy required to switch the magnetic state of the core and in addition the energy fed through the diode 24 to the bridge network 15. By suitable choice of circuit parameters the energy fed to the load may be made greater than the energy initially supplied to the core from the information pulse source 26, and the core can thus be considered to exhibit gain.

When it is desired to store a write "0" command in the writing circuit and apply a write "0" output pulse to the network 15 a pulse 41 is applied from the write "0" information source 26 to the set winding 21 of the "0" core 21. The functioning of the core 19 is identical with that of core 18 and need not be redescribed. Advantageously, however, the two information sources are related to each other so that only one core may be set at a time. As pointed out above the magnetic state of a core that has been set is depicted by the point 29 on the hysteresis loop of Fig. 2 and the magnetic state of the unset core by the point 28. When the advance pulse 34 is applied to the two advance windings 22, which are connected in series, the magnetic state of the set core changes, as described above, from point 29 through point 30 to point 28 with a large change in flux, thereby inducing an output pulse 39 in the output winding 23 of the set core. However, the magnetic state of the unset core merely changes from the point 28 to the point 30 and back to the point 28 again with a very small change in flux density.

While it is desirable that only one core at a time be set, if, in fact, both cores are simultaneously set, no information will be written by the magnetic head 10 on the magnetizable surface 11, as described further below.

In accordance with an aspect of this invention, the magnetic head 10 is located in a bridge network 15 so that the current due to a write "X" pulse 39 flows through the winding or windings 12 on the head 10 in one direction and the current due to a write "0" pulse 43 in the other direction. This is attained by connecting the leads from the output windings 23 of the two cores 18 and 19 to the two different pairs of corners or terminals of the bridge network 15. Thus the direction of the current through the arms of the network due to the write "X" pulse 39 is indicated by the arrows 45 and the direction of the current due to the write "0" pulse 43 by the arrows 46. As can be seen the directions of the current through the windings 12 of the head 10 for these two conditions are opposite to each other. Thus the cell of the magnetizable surface 11 may be magnetized in either of two directions, representing storage of an "X" and a "0." Further it is apparent that if both currents are present at the same time, they cancel each other out and have no effect on the head 10.

A reading amplifier 50, which may be of the type disclosed in the above-mentioned Cornell-McGuigan-Murphy application, is connected across the output of the windings 12 of the magnetic head 10 and applies a pulse to an appropriate load circuit 51 on reading of the information stored in a cell on the magnetic surface 11.

Figure 3:
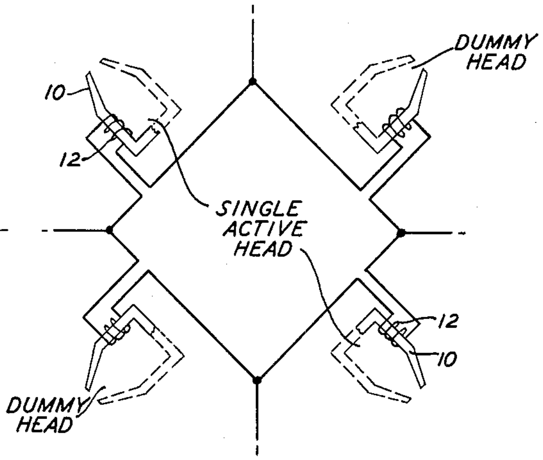
Fig. 3 is a schematic representation of a bridge network in accordance with another particular embodiment of this invention that may be employed in the embodiment of Fig. 1.

The bridge network 15 depicted in Fig. 1 may advantageously be employed in the general combination of this invention but is wasteful in two respects; first, half of the output current from the core 18 or 19 is diverted through balancing arms 16, contributing nothing to the writing of the spot on the magnetic surface 11, and, second, three of the four bridge arms are balancing elements. A bridge network that may be employed in accordance with another specific illustrative embodiment of this invention is depicted in Fig. 3. In this network only a single active head 10 is employed, the two windings 12 of the head being electrically positioned in opposite arms of the bridge network. As only half of the magnetic head is located in the, now, two active arms of the bridge, there need similarly be only half a dummy head in each of the compensating arms of the bridge network, and thus the number of dummy heads required, if used to provide the compensation, is considerably reduced. This bridge network has the slight disadvantage that since the winding on the magnetic head 10 is now split between two arms of the bridge network, only half as much read back voltage is applied during the reading operation by the head to the reading amplifier. However, this loss is not serious as adequate voltage gain may readily be obtained by the reading amplifier 50 and the gain in power of this network over that disclosed in Fig. 1 is of greater consequence.

It is to be understood that the above-described arrangements are illustrative of the application of the principles of the invention. Numerous other arrangements may be devised by those skilled in the art without departing from the spirit and scope of the invention.

What is claimed is:

1. In an information storage device, a magnetizable surface, a magnetic head in proximity to said surface for changing the flux condition of a discrete area of said surface, a bridge network including a winding on said magnetic head in at least one arm thereof, a first magnetic core having a plurality of windings thereon, one of said windings constituting an output winding and being connected between two opposite terminals of said bridge network, means for applying a pulse to a set winding when one value of information is to be written on said surface, a second magnetic core having a plurality of windings thereon, one of said second core windings constituting an output winding and being connected between the other two opposite terminals of said bridge network, means for applying a pulse to a set winding of said second core when another value of information is to be written on said surface, and means for applying a pulse to another winding on each of said cores to cause an output pulse to appear at the output winding of the core in which an element of information has been stored by one of said information pulse applying means.

2. In an information storage device in accordance with claim 1, the combination further comprising means for preventing current flowing in said output windings on application of said pulses to said set windings, said means comprising unidirectional current means electrically connected between said output windings and one of each of said opposite terminals of said bridge network.

3. In an information storage device in accordance with claim 1, the combination further comprising means connected across said magnetic head in one arm of said bridge for reading the flux condition of said discrete area of said magnetizable surface, said means comprising a reading amplifier.

4. In an information storage device, a magnetizable surface, a magnetic head in proximity to said surface for changing the flux condition of a discrete area of said surface, said head comprising a pair of coils, means for applying current to said head to change said flux condition, said means comprising a magnetic core having a plurality of windings thereon, means for applying an information pulse to one of said windings, means for applying an advance pulse to another of said windings, and means for applying an output pulse to said magnetic head to cause current to flow in said coils in the proper direction for changing the flux condition of said discrete area in accordance with said information pulse, said last-mentioned means including an output winding on said core, a bridge network having said coils electrically connected in two opposite arms thereof, and means connecting said output winding to opposite terminals of said bridge network.

5. In an information storage device, a magnetizable surface, a magnetic head in proximity to said surface for changing the flux condition of a discrete area of said surface, and means for applying current to said head in the proper direction to change said flux condition in accordance with either of two values of information, said last-mentioned means including a pair of magnetic cores, a set winding on each of said cores, means for applying a pulse to one of said set windings when one value of information is to be written on said discrete area and to the other of said set windings when the other value of information is to be written on said discrete area, an advance winding on each of said cores, means for applying an advance pulse to each of said advance windings, an output winding on each of said cores, a bridge network, said bridge network having said magnetic head electrically connected in at least one arm thereof and compensating networks connected in the other arms thereof, and means connecting one of said output windings to one set of opposite terminals of said bridge network and the other output winding to the other set of opposite terminals of said bridge network.

6. In an information storage device in accordance with claim 5, said compensating networks being defined by dummy magnetic heads.

7. In an information storage device in accordance with claim 5 wherein said magnetic head comprises a pair of coils, said coils being electrically connected in opposite arms of said bridge network.

8. In an information storage device, a magnetizable surface, a magnetic head in proximity to said surface for changing the flux condition of a discrete area of said surface, said head comprising a pair of coils, and means for applying current to said coils in the proper direction to change said flux condition in accordance with either of two values of information, said last-mentioned means including a pair of magnetic cores having a plurality of windings thereon including set, advance and output windings, means for applying a pulse to one of said set windings when one value of information is to be written on said discrete area and to the other of said set windings when the other value of information is to be written on said discrete area, means for applying an advance pulse to each of said windings, a bridge network having said coils in opposite arms thereof, and means connecting one of said output windings to one pair of opposite terminals of said bridge network and the other output winding to the other pair of opposite terminals of said bridge network.

9. In an information storage device, a moving magnetizable surface, a magnetic head in proximity to said surface for changing the flux condition of a discrete area of said surface, and means for applying current to said head in the proper direction to change said flux condition in accordance with either of two values of information, said last-mentioned means including a pair of magnetic cores, a set winding on each of said cores, means for applying a pulse to one of said set windings when one value of information is to be written on said discrete area and to the other of said set windings when the other value of information is to be written on said discrete area, an advance winding on each of said cores, means for applying an advance pulse to each of said windings when said discrete area is located under said magnetic head for the writing of information on said area, an output winding on each of said cores, a bridge network having said magnetic head electrically connected in at least one arm thereof and compensating networks connected in the other arms thereof, and means connecting one of said output windings to one set of opposite terminals of said bridge network and the outer output winding to the other set of opposite terminals of said bridge network, said connecting means including means for preventing current flow from said output windings on application of said pulses to said set windings.

10. In an information storage device in accordance with claim 9 wherein said magnetic head comprises a pair of coils, said coils being electrically connected in opposite arms of said bridge network.

11. In an information storage device, a magnetizable surface, a magnetic head in proximity to said surface for changing the flux condition of a discrete area of said surface, and means for applying current to said head to change said flux condition, said means comprising a magnetic core having a plurality of windings thereon, means for applying an information pulse to one of said windings, means for applying an advance pulse to another of said windings, and a bridge network having said magnetic head electrically positioned in one arm thereof and a third of said windings being connected across opposite terminals of said bridge network whereby an output pulse is applied to said magnetic head to cause current to flow in said head in the proper direction for changing the flux condition of said discrete area in accordance with said information pulse.

References Cited in the file of this patent

UNITED STATES PATENTS

| | | |
|---|---|---|
| 2,540,654 | Cohen | Feb. 6, 1951 |
| 2,654,080 | Browne | Sept. 29, 1953 |
| 2,680,819 | Booth | June 8, 1954 |
| 2,683,819 | Rey | July 13, 1954 |

OTHER REFERENCES

Static Magnetic Memory (Alden and Hanna), Electronics, January 1951 (page 110, Fig. 6).